(12) United States Patent
Sugawara

(10) Patent No.: US 11,816,380 B2
(45) Date of Patent: *Nov. 14, 2023

(54) COMMUNICATION APPARATUS, METHOD OF CONTROLLING SAME, AND NON-TRANSITORY COMPUTER-READABLE STORAGE MEDIUM

(71) Applicant: Canon Kabushiki Kaisha, Tokyo (JP)

(72) Inventor: Wahei Sugawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,760

(22) Filed: Jul. 12, 2022

(65) Prior Publication Data

US 2022/0365735 A1 Nov. 17, 2022

Related U.S. Application Data

(63) Continuation of application No. 17/359,896, filed on Jun. 28, 2021, now Pat. No. 11,429,332, which is a
(Continued)

(30) Foreign Application Priority Data

Dec. 28, 2018 (JP) ................................ 2018-248376

(51) Int. Cl.
*G06F 3/12* (2006.01)
*H04W 48/16* (2009.01)

(52) U.S. Cl.
CPC .......... *G06F 3/1286* (2013.01); *G06F 3/1204* (2013.01); *G06F 3/1236* (2013.01); *G06F 3/1292* (2013.01); *H04W 48/16* (2013.01)

(58) Field of Classification Search
CPC .... G06F 3/1286; G06F 3/1204; G06F 3/1236; G06F 3/1292; H04W 48/16
(Continued)

(56) References Cited

U.S. PATENT DOCUMENTS 10,455,630 B2 * 10/2019 Tanji ..................... H04W 76/14
11,429,332 B2 * 8/2022 Sugawara ............. G06F 3/1204
(Continued)

FOREIGN PATENT DOCUMENTS

JP 2003-008681 A 1/2003
JP 2003008681 A 1/2003
(Continued)

OTHER PUBLICATIONS

International Search Report issued in corresponding International Patent Application No. PCT/JP2019/043119 dated Dec. 24, 2019.
(Continued)

*Primary Examiner* — Miya J Cato
*Assistant Examiner* — Pawan Dhingra
(74) *Attorney, Agent, or Firm* — Venable LLP

(57) ABSTRACT

A communication apparatus capable of operating in at least one of a plurality of modes including a first communication mode in which wireless communication is performed with another apparatus via an external access point and a second communication mode in which wireless communication is performed with another apparatus bypassing the external access point, the communication apparatus comprising: controlling unit configured to control a communication mode of the communication apparatus by enabling or disabling at least one of the plurality of communication modes; and executing unit configured to execute search processing to search for an external access point near the communication apparatus, wherein in a case where both the first communication mode and the second communication mode are disabled, the second communication mode is enabled and the search processing is executed in the second communication mode.

19 Claims, 13 Drawing Sheets

Related U.S. Application Data continuation of application No. PCT/JP2019/043119, filed on Nov. 1, 2019.

(58) Field of Classification Search
USPC .............................. 358/1.15, 1.14, 1.13, 1.1
See application file for complete search history.

(56) References Cited

U.S. PATENT DOCUMENTS

| | | | | |
|---|---|---|---|---|
| 2014/0323131 A1* | 10/2014 | Yun | ....................... | H04W 76/15 |
| | | | | 455/436 |
| 2019/0050175 A1* | 2/2019 | Moriya | ................ | H04W 76/15 |

FOREIGN PATENT DOCUMENTS

| | | | |
|---|---|---|---|
| JP | 2004-112225 | A | 4/2004 |
| JP | 2004112225 | A | 4/2004 |
| JP | 2012-129734 | A | 7/2012 |
| JP | 2012129734 | A | 7/2012 |
| JP | 2016127545 | A | 7/2016 |
| JP | 2016152538 | A | 8/2016 |
| JP | 2016-178481 | A | 10/2016 |
| JP | 2016178481 | A | 10/2016 |
| JP | 2017135607 | A | 8/2017 |
| JP | 2017-212500 | A | 11/2017 |

OTHER PUBLICATIONS

Chinese Office Action dated Aug. 21, 2023 in counterpart Chinese Patent Appln. No. 201980086972.8.

* cited by examiner

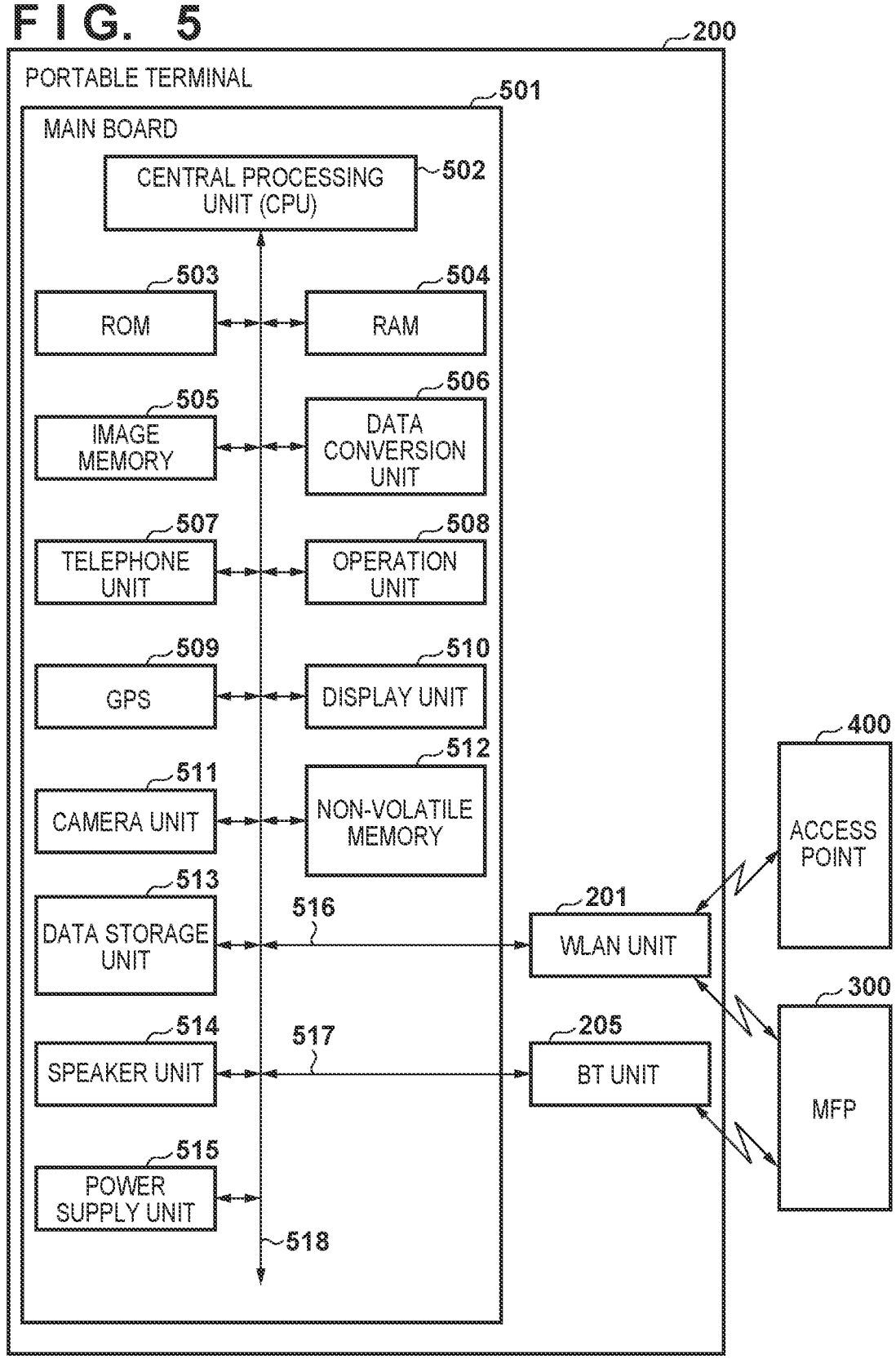

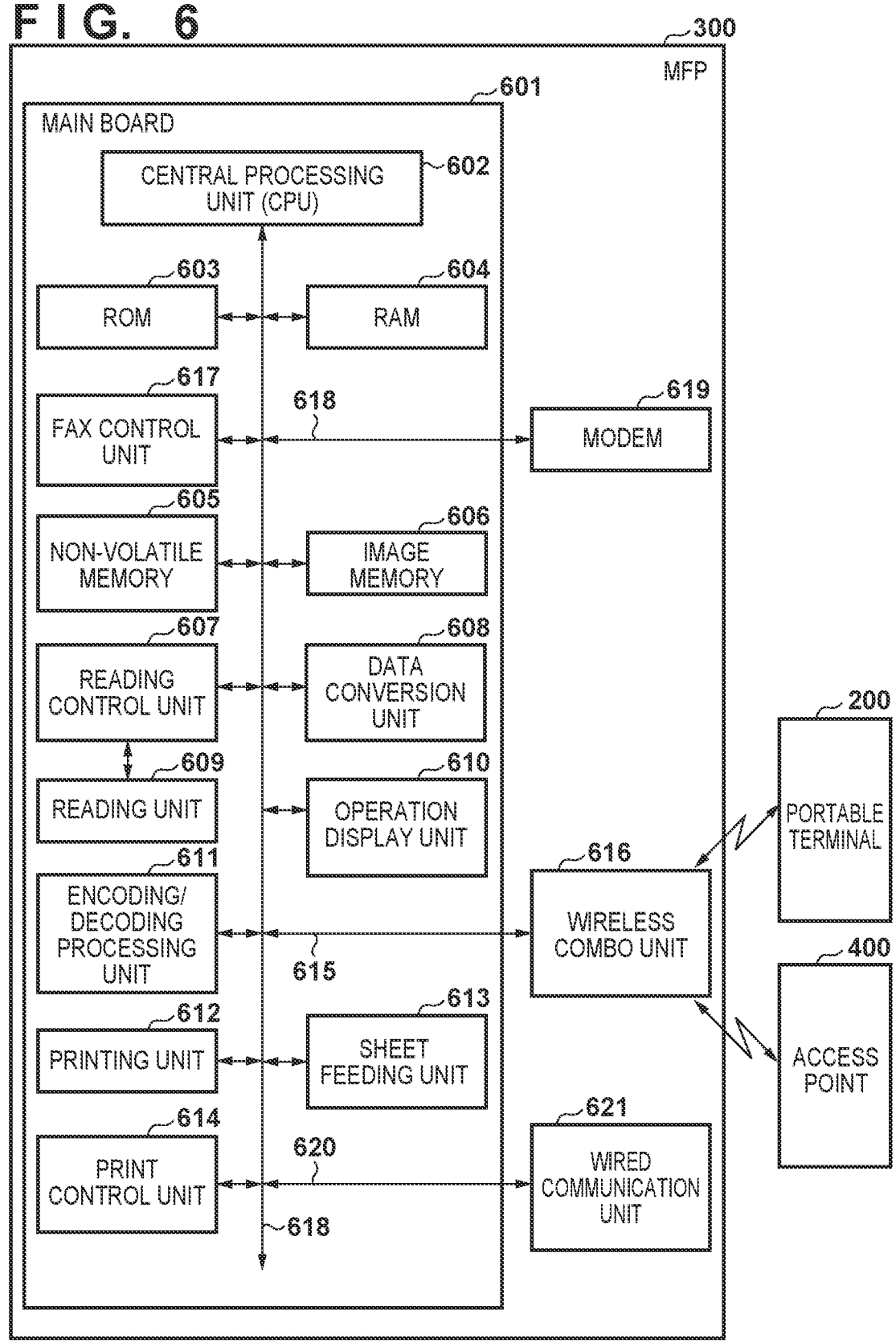

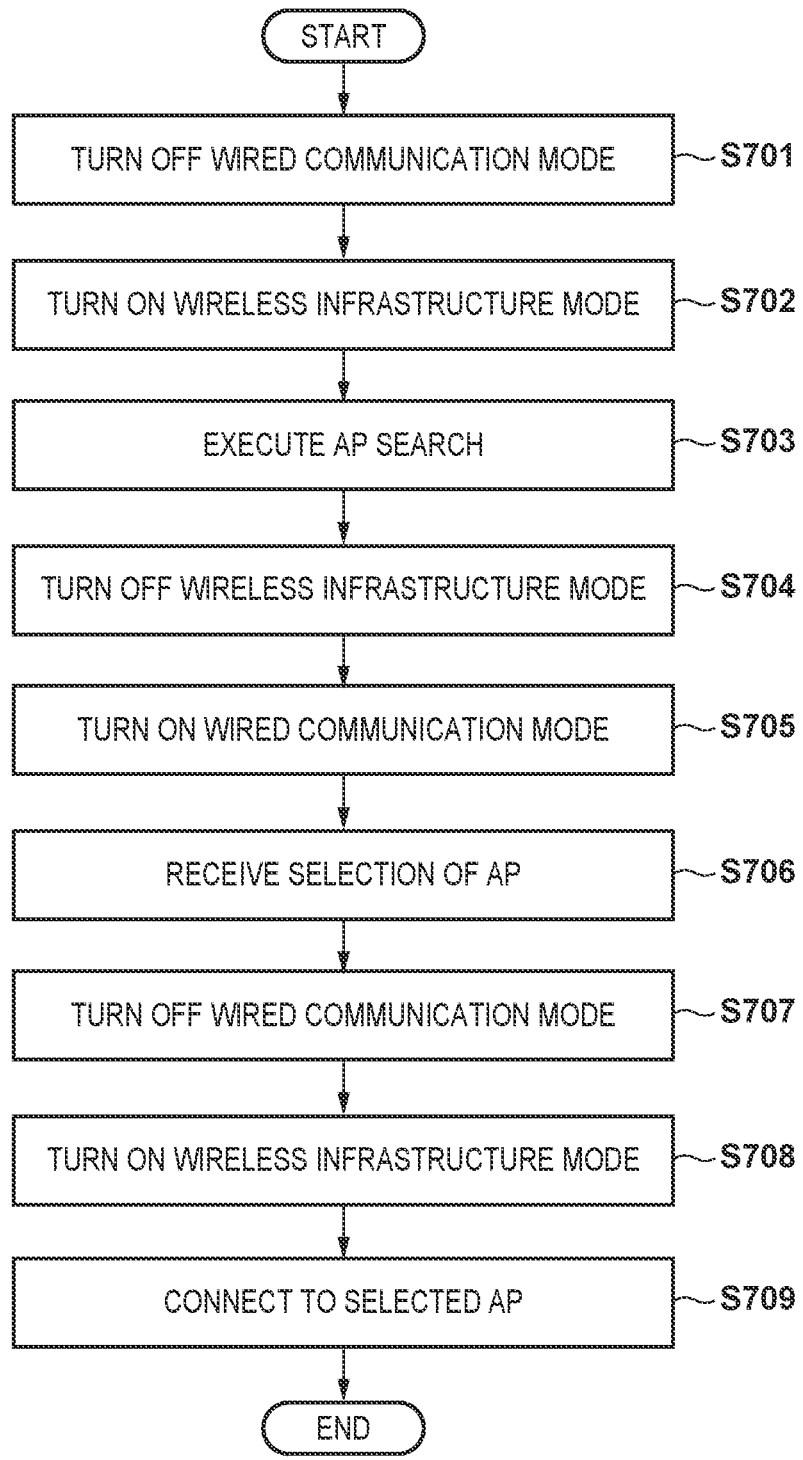

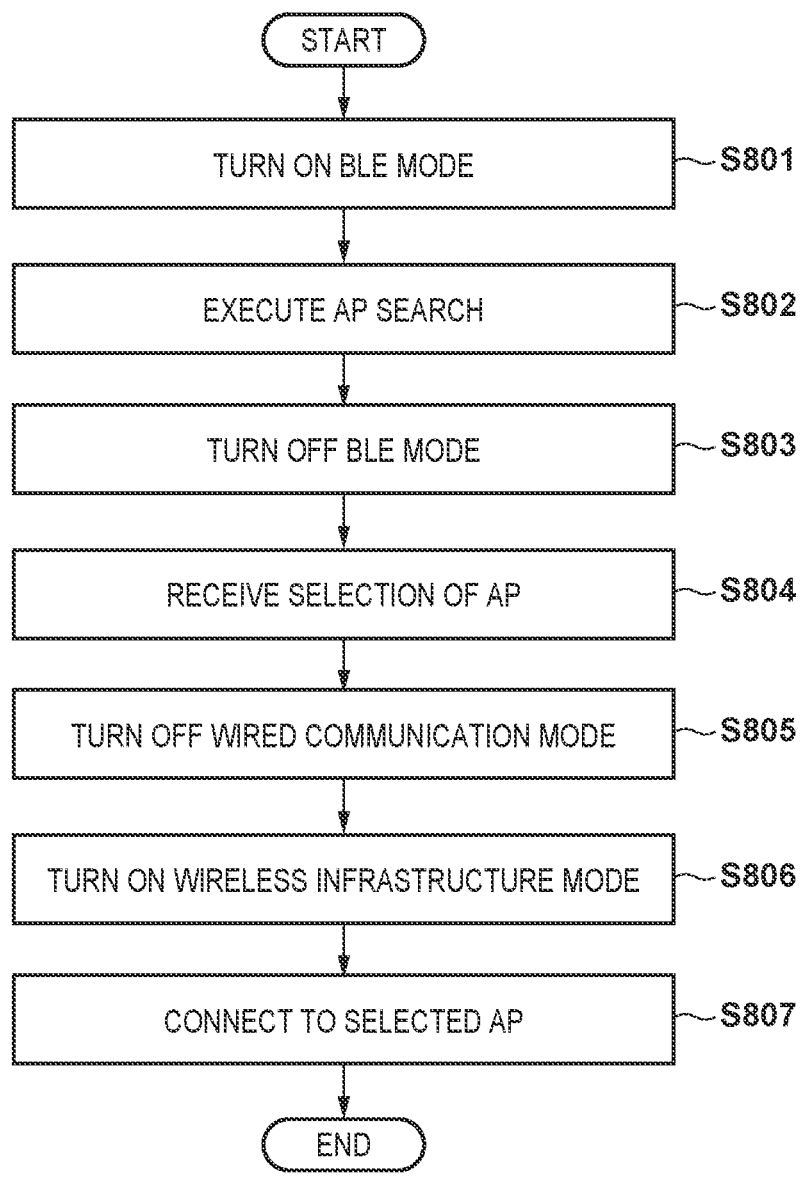

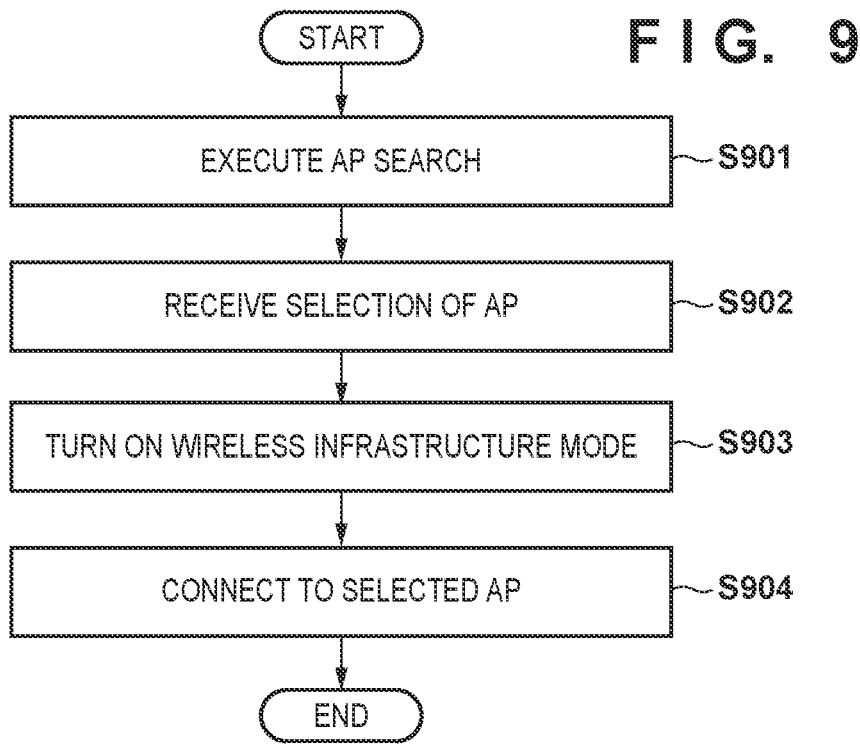
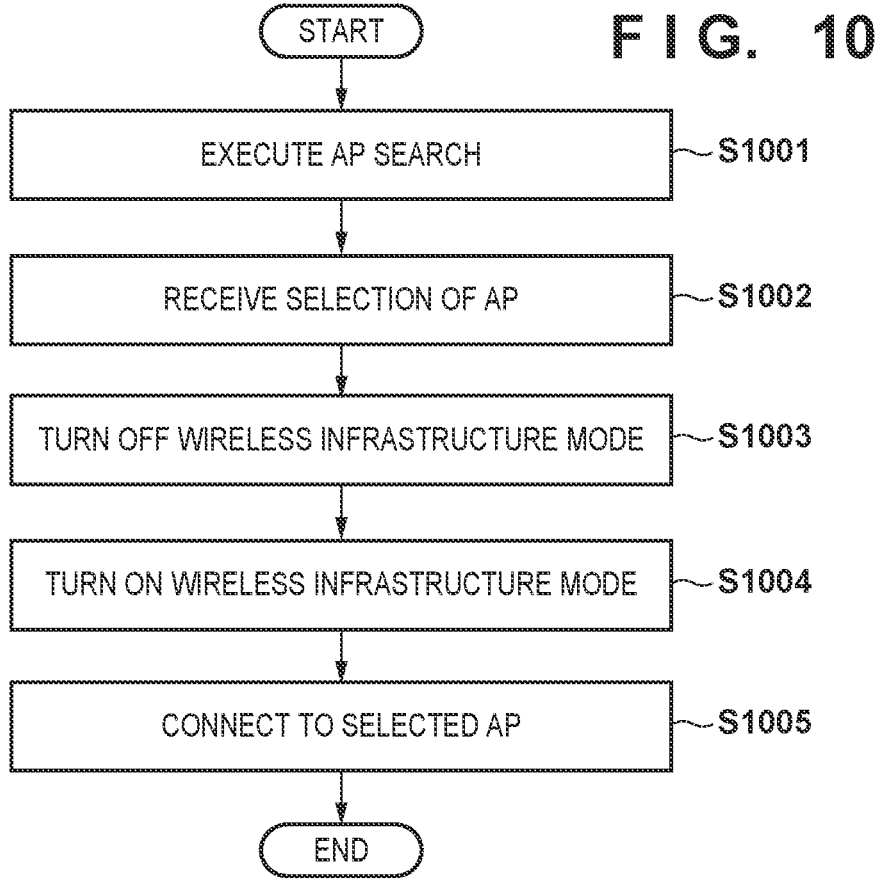

F I G. 15

| No | SSID | FREQUENCY BAND | AUTHENTICATION METHOD | ENCRYPTION METHOD | MAC ADDRESS | RADIO WAVE INTENSITY |
|---|---|---|---|---|---|---|
| 1 | abcde | 2.4GHz | OPEN | WEP64 | 36:aa:89:bb:60:11 | 60 |
| 2 | aabbccdd | 2.4GHz | OPEN | WEP128 | 48:33:90:ae:51:12 | 80 |
| 3 | bbaacc33 | 2.4GHz | WPA2-PSK | TKIP | 50:35:70:aa:44:bb | 40 |
| 4 | pppooo | 2.4GHz | WPA2-PSK | AES | 30:50:80:bb:15:10 | 55 |
| 5 | bbbbbb | 2.4GHz | WPA2-PSK | AES | 56:aa:44:60:bb:11 | 65 |

COMMUNICATION APPARATUS, METHOD OF CONTROLLING SAME, AND NON-TRANSITORY COMPUTER-READABLE STORAGE MEDIUM

CROSS-REFERENCE TO RELATED APPLICATIONS

This application is a Continuation U.S. patent application Ser. No. 17/359,896, filed Jun. 28, 2021, which is a Continuation of International Patent Application No. PCT/JP P2019/043119, filed Nov. 1, 2019, which claims the benefit of Japanese Patent Application No. 2018-248376 filed Dec. 28, 2018, all of which are hereby incorporated by reference herein in their entirety.

BACKGROUND OF THE INVENTION

Field of the Invention

The present invention relates to a communication apparatus, a method of controlling the same, and a non-transitory computer-readable storage medium.

Description of the Related Art

A known communication apparatus executes processing to search for an access point near itself (AP search). In Patent Document 1, an information processing device is described that searches for a connectible access point and displays a SSID list.

CITATION LIST

Patent Literature

[PTL 1] Japanese Patent Laid-Open No. 2016-127545

With the apparatuses capable of executing AP searches becoming more common, there is a demand for improvement in the user-friendliness of such communication apparatuses capable of executing AP searches.

SUMMARY OF THE INVENTION

One aspect of the present invention provides a communication apparatus capable of operating in at least one of a plurality of modes including a first communication mode in which wireless communication is performed with another apparatus via an external access point and a second communication mode in which wireless communication is performed with another apparatus bypassing the external access point, is characterized by including: controlling means for controlling a communication mode of the communication apparatus by enabling or disabling at least one of the plurality of communication modes; and executing means for executing search processing to search for an external access point near the communication apparatus, wherein in a case where both the first communication mode and the second communication mode are disabled, the second communication mode is enabled and the search processing is executed in the second communication mode.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain principles of the invention.

FIG. 5 is a diagram illustrating an example of the hardware configuration of the portable terminal according to the present invention.

FIG. 6 is a diagram illustrating an example of the hardware configuration of the MFP according to the present invention.

FIG. 7 is a sequence diagram of the processing relating to a known wireless communication setting.

FIG. 8 is a flowchart of the processing relating to wireless communication setting of the first embodiment that is executed with the MFP operating in a wired communication mode.

FIG. 9 is a flowchart of the processing relating to the wireless communication setting of the first embodiment that is executed with the MFP operating in a BLE communication mode.

FIG. 10 is a flowchart of the processing relating to the wireless communication setting of the first embodiment that is executed with the MFP operating in a wireless infrastructure mode.

FIG. 15 is a diagram illustrating an example of wireless access point search results according to the present invention.

DESCRIPTION OF EMBODIMENTS

Figure 1:
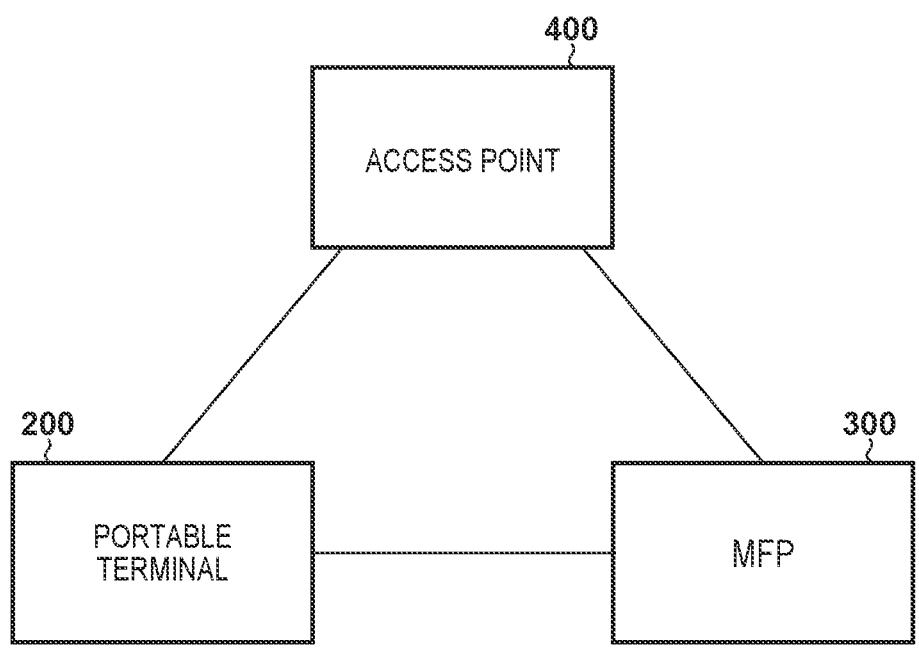
FIG. 1 is a diagram illustrating an example of the configuration of a wireless communication system according to the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

System Configuration

First, the system configuration for implementing the embodiments described below will be described using FIGS. 1 to 6.

FIG. 1 is a diagram illustrating an example of a conceptual configuration of a system including a portable communication terminal (hereinafter, a portable terminal), a communication apparatus, and an access point. A portable terminal 200 is an apparatus including a wireless LAN (WLAN) communication unit and a Bluetooth (registered trademark) communication unit. The portable terminal 200 may be a personal information terminal such as a personal digital assistant (PDA), a mobile phone, a digital camera, or the like. In the present invention, a multi-function peripheral (MFP) 300 capable of providing a copying service, a fax service, and a printing service is used as an example of the communication apparatus, however no such limitation is intended. The communication apparatus is only required to be capable of communicating with the portable terminal, and various apparatuses may be used as the communication apparatus. For example, in the case of a printer (printing apparatus), an inkjet printer, a full color laser beam printer, a monochrome printer, or the like may be used. Also, an apparatus capable of a service other than printing, such as a copy machine or a facsimile machine, a smart phone, a mobile phone, a PC, a tablet terminal, a PDA, a digital camera, a music playback device, a storage device, a projector, a smart speaker, and the like, may be used. Note that a smart speaker refers to an apparatus sends processing instructions to a device on the same network according to audio from a user, responds to audio from a user, informs a user of information obtained via the network, and the like. Also, a single-function printer with a single function (hereinafter, referred to as SFP) may be used. An access point 400 is an external access point external to the portable terminal 200 and external to the MFP 300 and is an apparatus such as a wireless LAN router or the like. The access point 400 includes a WLAN communication unit and provides communication in the wireless infrastructure mode by relaying communications between the apparatuses connected to the access point.

The portable terminal 200 and the MFP 300, using their respective WLAN communication units, may perform wireless infrastructure mode wireless communication via the access point 400 or may perform peer-to-peer (P2P) communication such as Wi-Fi Direct (registered trademark) (WFD). Also, the portable terminal 200 and the MFP 300 may perform P2P communication via a BT communication unit. Each mode will be described in detail below using FIGS. 7 to 10. Note that the portable terminal 200 and the MFP 300 are capable of executing processing corresponding to a plurality of printing services via WLAN as described below.

Figure 2:
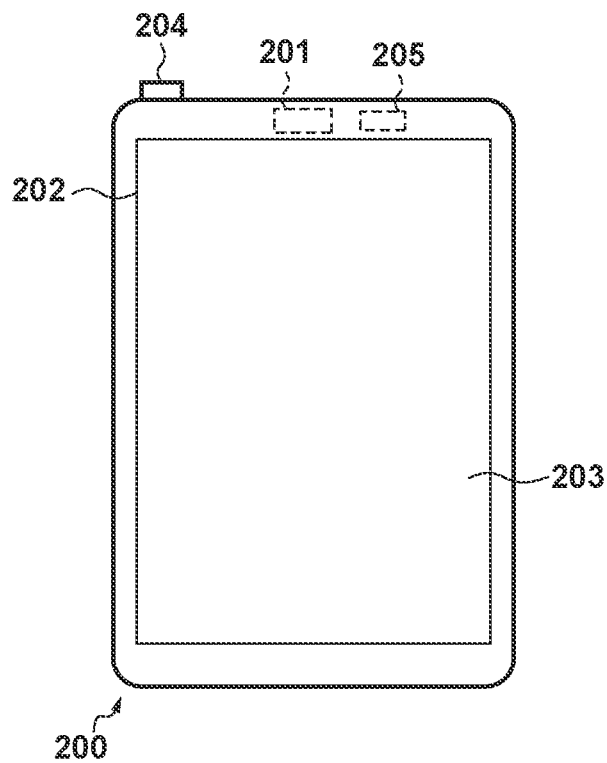
FIG. 2 is a diagram illustrating the appearance of a portable terminal according to the present invention.

FIG. 2 is a diagram illustrating the appearance of the portable terminal 200 according to the present embodiment. In the present embodiment, a smart phone is used as an example of the portable terminal 200. A smart phone refers to a multi-functional mobile phone equipped with mobile phone functionality, as well as camera, web browser, email, and other functionality. A WLAN unit 201 is a unit for communicating via WLAN. The WLAN unit 201, for example, is capable of data (packet) communication in a WLAN system compliant with the Institute of Electrical and Electronics Engineers (IEEE) 802.11 series. In the present embodiment, the WLAN unit 201 is capable of communications in both the 2.4 GHz frequency band and the 5 GHz frequency band. Also, with wireless communication using the WLAN unit 201, communication based on Wi-Fi Direct (registered trademark) and communication based on Wi-Fi in the software access point (SoftAP) mode and the wireless infrastructure mode are possible. A Bluetooth (BT) unit 205 is capable of communication compliant with IEEE 802.15.1 using the 2.4 GHz frequency band. Specifically, the BT unit 205 is capable of BT communication, such as Bluetooth Classic (Bluetooth BR/EDR, Bluetooth+HS), Bluetooth Low Energy (BLE), or the like. A display unit 202 is a display provided with an LCD display mechanism, for example. An operation unit 203 is provided with a touch panel operation mechanism and detects a user operation. In a representative example of the method of operating, the display unit 202 displays button icons or a software keyboard, and an operation event of the user touching these sections is detected. These methods may be used. A power key 204 is a hard key used to switch the power on and off.

Figure 3:
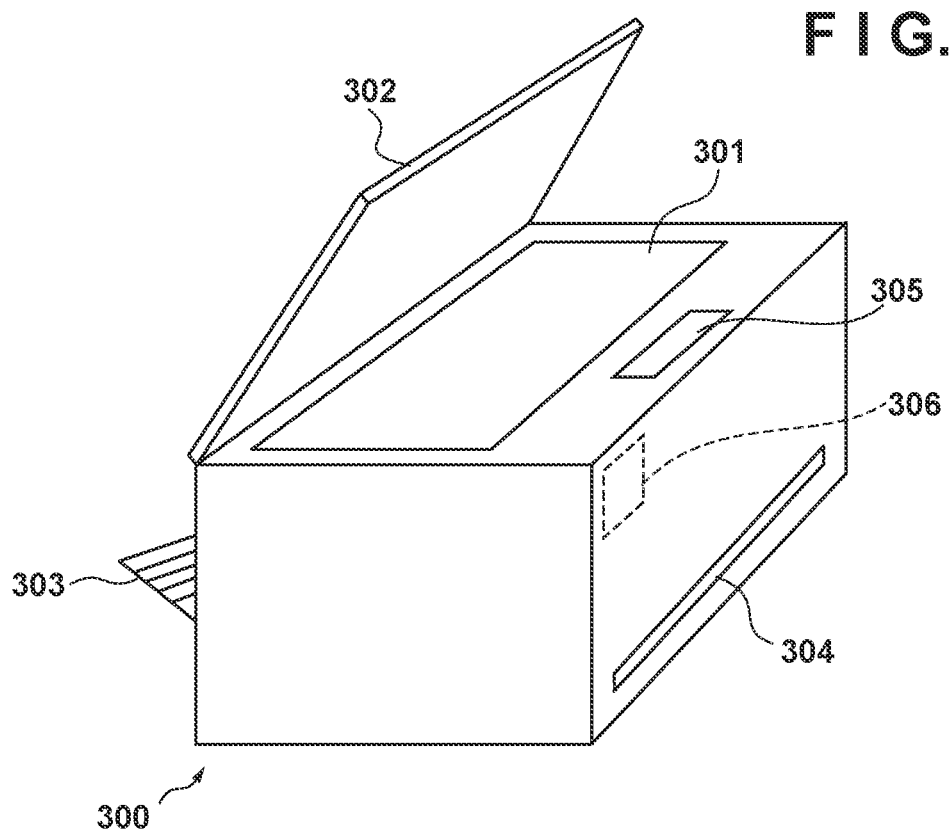
FIG. 3 is a diagram illustrating the appearance of an MFP according to the present invention.

FIG. 3 is a diagram illustrating the appearance of the MFP 300 according to the present embodiment. As illustrated in FIG. 3, a document table 301 is a glass-like transparent table on which a document to be read by a scanner (reading unit) is placed. A document cover 302 is a cover used to press a document when the scanner reads the document and prevents external leakage of light from a light source, with which the document is irradiated at the time of reading. A printing paper insert port 303 is an insert port on which paper sheets of various sizes can be set. Paper sheets set on the printing paper insert port 303 are conveyed one by one to a printing unit inside the MFP 300 and are discharged from a printing paper discharge port 304 after printing is performed by the printing unit. An operation display unit 305 is constituted by, for example, keys such as character input keys, cursor keys, an enter key, and a cancel key and a light-emitting diode (LED) or a liquid crystal display (LCD) and used by the user to activate various functions of the MFP or make various settings. Alternatively, the operation display unit 305 may be constituted by a touch panel. A wireless communication antenna 306 is an embedded antenna for performing WLAN and BT communication. The MFP 300 is also capable of communicating in the 2.4 GHz and 5 GHz frequency band via WLAN and capable of communicating in the 2.4 GHz frequency band via BT.

Figure 4A:
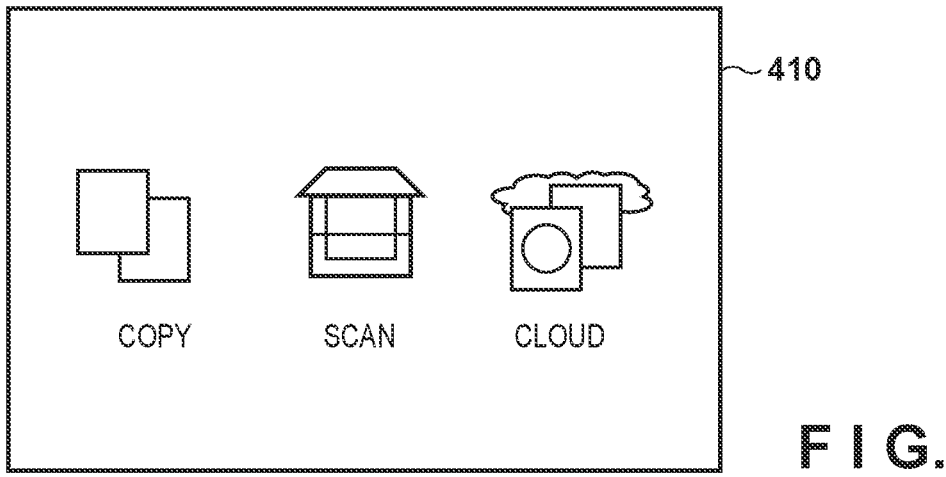
FIG. 4A is a diagram illustrating an example of a screen displayed on an operation display unit of the MFP according to the present invention.
Figure 4B:
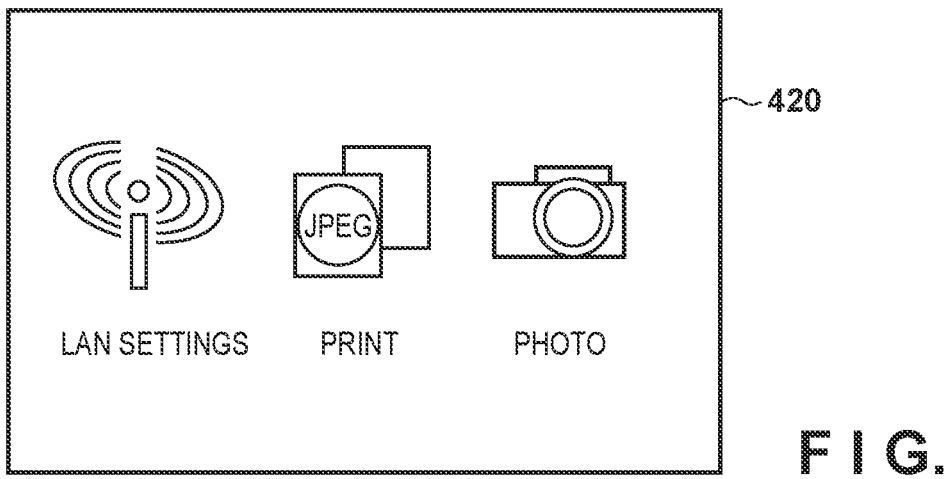
FIG. 4B is a diagram illustrating an example of a screen displayed on the operation display unit of the MFP according to the present invention.
Figure 4C:
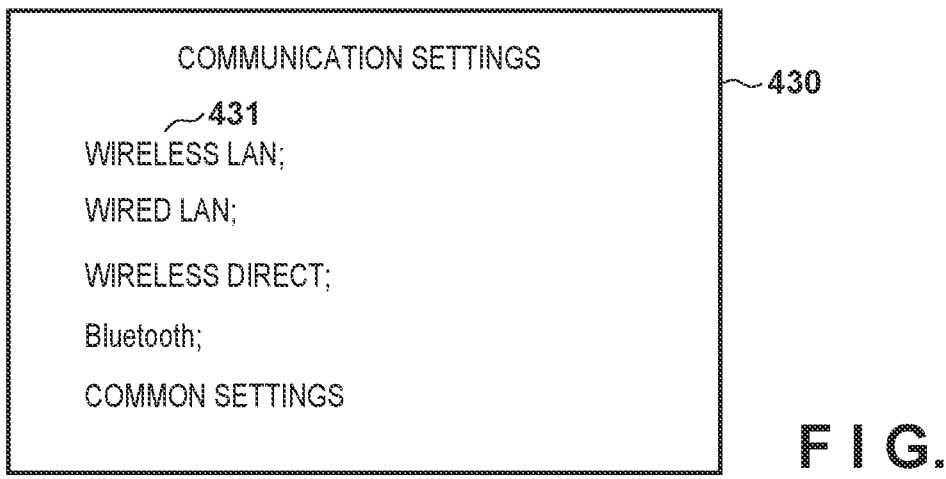
FIG. 4C is a diagram illustrating an example of a screen displayed on the operation display unit of the MFP according to the present invention.

FIGS. 4A to 4C are diagrams schematically illustrating examples of screen displays of the operation display unit 305 of the MFP 300. FIG. 4A illustrates an example configuration of a home screen 410 illustrating a state when the MFP 300 is powered on and printing, scanning, or similar operations are not being performed (idle state). At the home screen 410, by performing a key operation or a touch panel operation, a copy or scan operation can be performed, and various settings can be made and the functions can be executed from display of a menu of cloud functions using Internet communication. From the home screen 410, by performing a key operation or a touch panel operation, functions other than those illustrated in FIG. 4A can be seamlessly displayed. A screen 420 illustrated in FIG. 4B is an example of a screen where printing or photo functions can be executed and communication settings may be changed. A screen 430 illustrated in FIG. 4C illustrates an example of a screen displayed when communication settings is selected at the screen 420. From the screen 430, it is possible to change various LAN settings, such as enable/disable the wireless infrastructure mode described below, enable/disable the wired communication mode, enabled/disable the WFD mode and change BT settings such as enable/disable BT.

Hardware Configuration

Terminal Device

FIG. 5 is a block diagram illustrating an example of the hardware configuration of the portable terminal 200. The portable terminal 200 includes a main board 501 for executing main control of the apparatus itself, the WLAN unit 201 for performing WLAN communication, and the BT unit 205 for performing BT communication. In the main board 501, a central processing unit (CPU) 502 is a system control unit that controls the overall operations and processing of the portable terminal 200. The following processing by the portable terminal 200 is executed under the control of the CPU 502. Read-only memory (ROM) 503 stores control programs executed by the CPU 502, embedded operating system (OS) programs, and the like. In the present embodiment, the respective control programs stored in the ROM 503 execute software control such as scheduling and task switching under the management of the embedded OS stored in the ROM 503.

Random-access memory (RAM) 504 is constituted by static RAM (SRAM), for example, and stores data such as program control variables. Also, the RAM 504 stores data, such as setting values registered by the user, management data of the portable terminal 200, and the like and includes various work buffer areas. An image memory 505 is constituted by dynamic RAM (DRAM), for example, and temporarily stores image data received via the WLAN unit 201 and image data read out from a data storage unit 513 for processing by the CPU 502.

Anon-volatile memory 512 is constituted by a flash memory, for example, and stores data even after power is turned off. Note that the memory configuration is not limited to this. For example, the image memory 505 and the RAM 504 may share a memory, or data may be backed up in the data storage unit 513. Also, in the present embodiment, DRAM is used as the image memory 505. However, no such limitation is intended, and another storage medium, such as a hard disk or a non-volatile memory, may be used.

A data conversion unit 506 executes analysis of data of various formats and data conversion, such as color conversion and image conversion. A telephone unit 507 controls a telephone line and implements telephone communication by processing audio data input/output via a speaker unit 514. An operation unit 508 controls signals from the operation unit 203. A Global Positioning System (GPS) 509 obtains position information such as the current latitude and longitude of the portable terminal 200. A display unit 510 electronically controls the display contents of the display unit 202, allows for various input operations, and can display the operation state of the MFP 300, status conditions, and the like.

A camera unit 511 has a function of electronically recording and encoding an image input via a lens (not illustrated). An image captured by the camera unit 511 is stored in the data storage unit 513. The speaker unit 514 implements a function of inputting or outputting audio for the telephone function, as well as an alarm notification and the like. A power supply unit 515 is a portable battery that controls power supply to the apparatus. Power supply states include a battery dead state in which the battery has no remaining amount, a power-off state in which the power key 204 is not pressed, an active state in which the apparatus is normally active, and a power saving state in which the apparatus is active but is set in a power saving mode.

As described above, the portable terminal 200 can perform WLAN and BT wireless communication by using the WLAN unit 201 and the BT unit 205. Accordingly, the portable terminal 200 can communicate data to another device such as the MFP 300 or the like. Each communication unit converts the data into packets and transmits the packets to the other device. Also, each communication unit receives the packets from the external other device, restores the packets to the original data, and transmits the data to the CPU 502. The WLAN unit 201 is connected to the main board 501 via a bus cable 516. The BT unit 205 is connected to the main board 501 via a bus cable 517. The WLAN unit 201 and the BT unit 205 are communication units for implementing communication compliant with a standard. The various components and communication units in the main board 501 are connected to one another via a system bus 518 managed by the CPU 502.

MFP

FIG. 6 is a block diagram illustrating an example of the hardware configuration of the MFP 300 according to the present embodiment. The MFP 300 includes a main board 601 for executing main control of the apparatus itself, a wireless combo unit 616 for performing WLAN and BT communication with a single antenna, a modem 619 for using a telephone line, and a wired communication unit 621 for wired communication.

In the main board 601, a central processing unit (CPU) 602 is a system control unit that controls the overall operations and processing of the MFP 300. The following processing by the MFP 300 is executed under the control of the CPU 602. ROM 603 stores control programs executed by the CPU 602, embedded OS programs, and the like. In the present embodiment, the respective control programs stored in the ROM 603 execute software control such as scheduling and task switching under the management of the embedded OS stored in the ROM 603. RAM 604 is constituted by SRAM, for example, and stores data, such as setting values registered by the user, management data of the MFP 300, and the like and includes various work buffer areas. The control unit (information processing unit) of the MFP 300 is constituted by the CPU 602, the ROM 603, the RAM 604, and the like.

A non-volatile memory 605 is constituted by a flash memory, for example, and stores data even after power is turned off. An image memory 606 is constituted by a memory such as a DRAM, for example, and stores image data received via the wireless combo unit 616, image data processed by an encoding/decoding processing unit 611, and the like. Also, as with the memory configuration of the portable terminal 200, the memory configuration is not limited to this. A data conversion unit 608 analyzes data of various formats, converts image data into print data, and the like.

A reading control unit 607 controls a reading unit 609 (for example, a contact image sensor (CIS) to optically read an image on a document. Next, an image signal obtained by converting this into electrical image data is output. At this time, the reading control unit 607 may perform various processing, such as binarization processing, halftone processing, and the like and then perform output. An operation display unit 610 corresponds to the operation display unit 305 of FIG. 3. The encoding/decoding processing unit 611 performs encoding and decoding processing and enlargement and reduction processing of image (JPEG, PNG, etc.) handled by the MFP 300. A sheet feeding unit 613 holds sheets for printing. Under the control of a print control unit 614, sheets are fed from the sheet feeding unit 613. In particular, the sheet feeding unit 613 can be provided with a plurality of sheet feeding units in order to hold a plurality of types of sheets in one apparatus. Also, which sheet feeding unit is used to feed sheets is controlled by the print control unit 614.

The print control unit 614 performs various image processing such as smoothing processing, print density correction processing, and color correction on the image data to be printed, and then outputs the image data to a printing unit 612. The printing unit 612 may be, for example, an ink jet printer that prints an image by discharging ink supplied from an ink tank from a print head. The print control unit 614 also has a function of periodically reading the information of the printing unit 612 and updating the information of the RAM 604. Specifically, the status information, such as the remaining amount in the ink tank and the status of the print head, is updated.

The MFP 300 is equipped with a wireless combo unit 616 similar to wireless combo unit 616 including the WLAN unit 201 and the BT unit 205 of the portable terminal 200. The wireless combo unit 616 can implement both functions of the WLAN unit 201 and the BT unit 205 of the portable terminal 200. In this example, the wireless combo unit 616 is connected to the main board 601 via a bus cable 615. Note that the MFP 300 is capable of communicating with devices such as the portable terminal 200 by P2P via WFD or normal Wi-Fi. In the present embodiment, in P2P communication, the MFP 300 operates as the master station (parent station), and the portable terminal 200 operates as the client station (child station). The master station is an access point or a group owner. Thus, the MFP 300 has a software access point (hereinafter, SoftAP) function.

The modem 619 is a unit for performing communication using a telephone line. The modem 619 is connected to the main board 601 via a bus cable 618. The wired communication unit 621 is a unit for performing wired communication. The wired communication unit 621, for example, is capable of data (packet) communication in a wire LAN (Ethernet) system compliant with the IEEE 802.3 series. Also, with wired communication using the wired communication unit 621, communication in a wired mode is possible. In this example, the wired communication unit 621 is connected to the main board 601 via a bus cable 620. The various components and communication units in the main board 601 are connected to one another via a system bus 622 managed by the CPU 602.

Peer-to-Peer (P2P) Communication Mode

To establish a P2P connection, the MFP 300 of the present embodiment operates in a P2P mode. Note that in the present embodiment, P2P connection refers to apparatuses directly communicating (a direct wireless connection) with one another bypassing an external apparatus. In the present embodiment, the P2P mode includes the three modes described below, for example.

Mode A (SoftAP mode)
Mode B (Wi-Fi Direct (WFD) mode)
Mode D (Bluetooth Low Energy (BLE) mode)

The SoftAP mode is a mode in which the MFP 300 operates as a software access point and communicates with a communication partner apparatus, i.e., a client, via normal Wi-Fi, not WFD. WFD mode is a mode in which communications are performed via WFD. Note that WFD is a standard set by the WiFi Alliance. In communication via WFD, which one of a plurality of WFD-compatible devices operates as the group owner is determined according to a sequence called a group owner negotiation. Note that the group owner may be determined without using a group owner negotiation. In the present embodiment, control is executed such that, in communication via WFD executed by the MFP 300, the MFP 300 is always the group owner and the communication partner apparatus is always the client. Note that the group owner has a function of determining the frequency band or communication channel used in communication via WFD. Also, the BLE mode is a mode in which the MFP 300 operates as a slave and communication is performed with a communication partner apparatus, i.e., the master, via BLE.

Infrastructure Mode (Referred to as Wireless Infrastructure Mode Below)

Wireless infrastructure mode is a mode in which the apparatuses performing communication (for example, the portable terminal 200 and the MFP 300) communicate via WLAN via an external apparatus (for example, the access point 400) that controls the network. In the present embodiment, in a case where the MFP 300 sets itself to the wireless infrastructure mode, the MFP 300 searches for an access point near the MFP 300 and generates a list of candidates of access points able to be used in wireless infrastructure mode. This search process is called an AP search. Specifically, in an AP search, the MFP 300 searches for a beacon emitted by an access point near the MFP 300 and searches and retrieves an access point by receiving the beacon. The MFP 300 operating in the wireless infrastructure mode connects to the access point selected by the user from the list (AP list) of access points retrieved by the AP search and implements infrastructure communication (communication with the portable terminal 200 via the access point).

Wired Communication Mode

Wired communication mode is a mode in which the apparatuses performing communication (for example, the portable terminal 200 and the MFP 300) communicate via a wired interface, such as a wired LAN, a universal serial bus (USB), or the like. In a case where the MFP 300 operates in the wired communication mode, the MFP 300 cannot operate in the wireless infrastructure mode. Note that the MFP 300 is capable of operating in the P2P mode even if the MFP 300 is operating in the wired communication mode.

Simultaneous Operation

The MFP 300 of the present embodiment is capable of performing communication via the wireless infrastructure mode and communication via the P2P mode simultaneously (in parallel). Thus, the MFP 300 is capable of maintaining a connection for communicating via the wireless infrastructure mode and a connection for communicating via the P2P mode simultaneously (in parallel). Herein, a connection for communicating via the wireless infrastructure mode (connection with the portable terminal 200 via the access point 400) is referred to as an infrastructure connection. Also, a connection for communicating via the P2P mode (connection with the portable terminal 200 bypassing the access point 400) is referred to as a P2P connection. A P2P connection is a connection on a wireless network established with the MFP 300 or the portable terminal 200 as the AP. An infrastructure connection is a connection on a wireless network established by the access point 400. Also, simultaneously (in parallel) establishing an infrastructure connection and a P2P connection and operating with communications via an infrastructure connection and a P2P connection being simultaneously (in parallel) possible is referred to as simultaneous operation.

AP Search During P2P Mode Operation

In the present embodiment, in a case where the wireless infrastructure mode described below is self set, the MFP 300 searches for an access point near the MFP 300 and generates a list of candidates of access points able to be used in wireless infrastructure mode. This process is called an AP search. An AP search, typically, is executed using an antenna included in the WLAN unit 201. Thus, the MFP 300 is capable of executing an AP search with the wireless infrastructure mode in an enabled state.

The MFP 300 according to the present embodiment, as described above, is provided with the wireless combo unit 616 similar to the wireless combo unit 616 including the WLAN unit 201 and the BT unit 205. The wireless combo unit 616 performs communication in the wireless infrastructure mode and the P2P mode (WFD mode, SoftAP mode, BLE mode) with a single antenna (not illustrated). In other words, the antenna used for communication via the wireless infrastructure mode and the antenna used for communication via the P2P mode is the same antenna provided in the wireless combo chip that constitutes the wireless combo unit 616. Because the same antenna is used for the P2P mode and the wireless infrastructure mode, the MFP 300 of the present embodiment is capable of an AP search when the wireless infrastructure mode is in an enabled state, as well as when the P2P mode is in an enabled state.

Next, the process relating to a known wireless communication setting will be described. Typically, in a case where a wireless infrastructure mode is newly set up in the MFP 300 operating in the wired communication mode, the MFP 300 executes the processing illustrated in FIG. 7, for example. Note that the process illustrated in FIG. 7 is actually implemented by the CPU 602 reading out a program stored in a memory, such as the ROM 603, onto the RAM 604 and executing the program.

Specifically, first, the MFP 300 turns OFF (disables) the wired communication mode (step S701) and turns ON (enables) the wireless infrastructure mode (step S702). In this manner, the MFP 300 is made able to execute an AP search, and thus, the MFP 300 executes an AP search (step S703). Then, when the AP search is complete, the MFP 300 displays an AP list and turns OFF the wireless infrastructure mode (step S704). Next, the MFP 300 turns ON the wired communication mode (step S705), switching its mode back to the state before the AP search. Switching its mode back to the state before the AP search is performed so that communication is made enable even while the AP list is being displayed. Next, the MFP 300 receives a selection of an AP from the AP list (step S706) and sets up a new wireless infrastructure mode. Specifically, the MFP 300 turns OFF the wired communication mode (step S707) and turns ON the wireless infrastructure mode (step S708). Then, the MFP 300 connects to the AP selected from the AP list via WLAN (step S709) and infrastructure communication is made effective.

As described above, typically, the wireless infrastructure mode is turned ON in order to execute an AP search. Note that this typically process is executed not only in a case where a wireless infrastructure mode is newly set up in the MFP 300 operating in the wired communication mode. The same also applies to a case where a wired communication mode is newly set up in the MFP 300 operating in a communication mode other than the wireless infrastructure mode. However, it takes time from when a command is issued to enable the wireless infrastructure mode to when an AP search is actually able to be executed. The time required to set up the wireless infrastructure mode is preferably reduced by quickly transitioning to a state in which an AP search can be executed.

Thus, in the present invention, how to reduce the time required to set up the wireless infrastructure mode by quickly transitioning to a state in which an AP search can be executed will be described below.

Note that in the embodiment described below, the enabled (ON state) and disabled (OFF state) state of each of the communication modes are managed. For example, with the MFP 300, by monitoring and controlling the state of the wireless combo unit 616 and the wired communication unit 621, switching the enabled communication mode, controlling communication, and the like can be performed.

First Embodiment

Operations of the first embodiment of the present embodiment where, in a case where the apparatuses according to the present embodiment with the system configuration described above connect on a wireless LAN system, a wireless access point of a wireless network to join is detected without following a specific order when switching communication modes will now be described.

Screen Flow

Figure 11A:
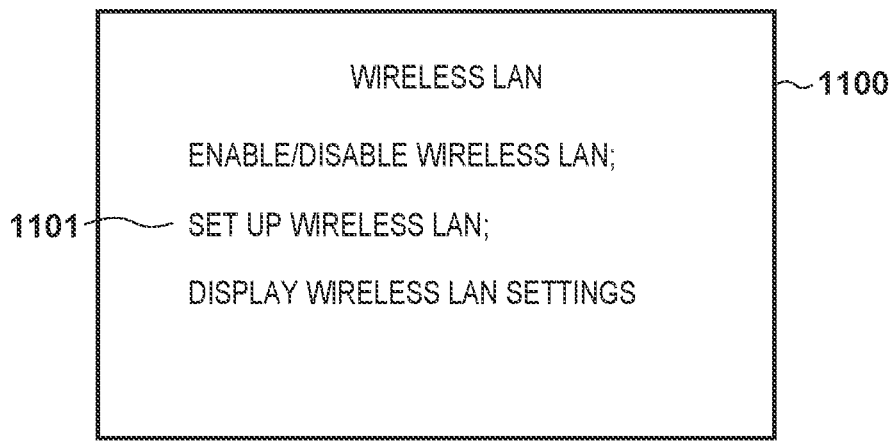
FIG. 11A is a diagram illustrating an example of a screen displayed when executing wireless LAN set up according to the present invention.
Figure 11B:
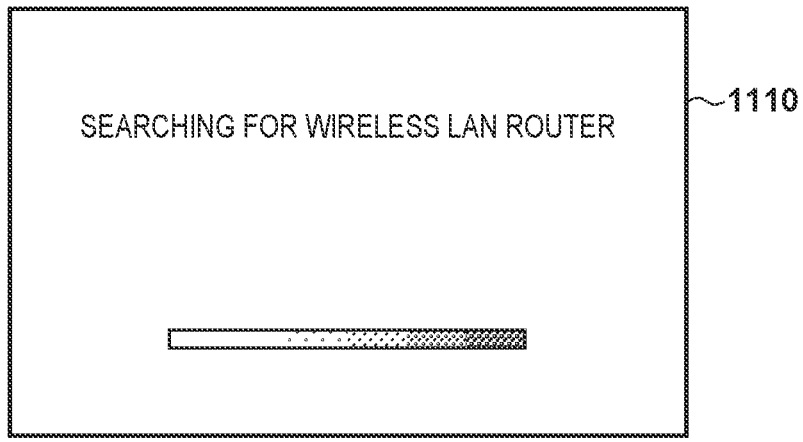
FIG. 11B is a diagram illustrating an example of a screen displayed when executing wireless LAN set up according to the present invention.
Figure 11C:
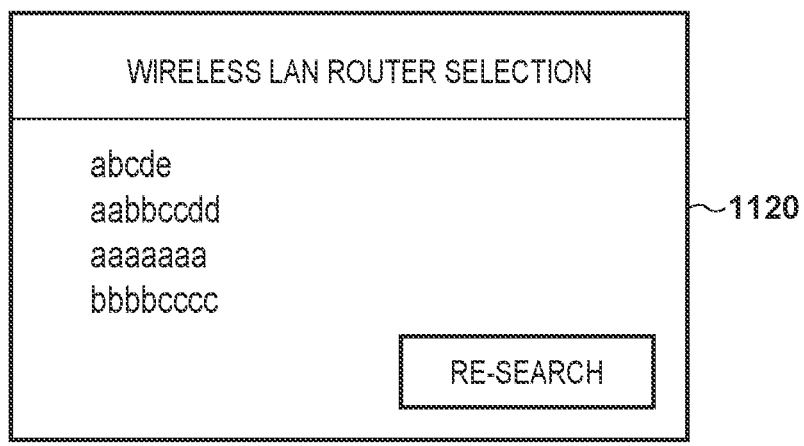
FIG. 11C is a diagram illustrating an example of a screen displayed when executing wireless LAN set up according to the present invention.

FIGS. 11A to 11C are screen flow diagrams of the operation display unit 305 of the MFP 300 according to the present embodiment of when a wireless LAN 431 is selected from a communication settings menu of the screen 430 of FIG. 4C. A screen 1100 illustrated in FIG. 11A is a screen displayed when the wireless LAN 431 is selected for newly setting up a wireless infrastructure mode at the screen 430 of FIG. 4C. The wireless LAN settings can be changed at the screen 1100. A screen 1110 illustrated in FIG. 11B is a screen displayed while a wireless access point search is being performed upon a wireless LAN set up 1101 being selected at the screen 1100 of FIG. 11A. A screen 1120 illustrated in FIG. 11C is a screen displaying a list of the identification names (service set identifier (SSID)) of the wireless access points obtained as a result of the AP search.

Processing Sequence

The processing executed to make wireless communication settings of the present embodiment when the MFP 300 is operating in the wired communication mode will now be described using FIG. 8. Note that the process illustrated in FIG. 8 is actually implemented by the CPU 602 reading out a program stored in a memory, such as the ROM 603, onto the RAM 604 and executing the program. Note that the present process is started in a case where the wireless LAN set up 1101 is selected at the screen 1100 when the MFP 300 is operating in the wired communication mode.

Specifically, first, after the wireless LAN set up 1101 is selected at the screen 1100, the MFP 300 turns ON (enables) the BLE mode while maintaining the wired communication mode (step S801). In the present embodiment, with an AP search via the BLE mode being made possible, the MFP 300 performs an AP search using the wireless combo unit 616 as described above (step S802). Then, when the AP search is complete, the MFP 300 displays an AP list and turns OFF the BLE mode (step S803). At this time, as the wired communication mode is being maintained, processing to switch its mode back to the state before the AP search is not required. Next, the MFP 300 receives a selection of an AP from the AP list (step S804) and sets up a new wireless infrastructure mode. Specifically, the MFP 300 turns OFF the wired communication mode (step S805) and turns ON the wireless infrastructure mode (step S806). Then, the MFP 300 connects to the AP selected from the AP list via WLAN (step S807) and infrastructure communication is made able to be executed.

Next, processing executed to make wireless communication settings of the present invention when the MFP 300 is operating in the BLE mode and not operating in another communication mode will be described using FIG. 9. Note that the process illustrated in FIG. 9 is actually implemented by the CPU 602 reading out a program stored in a memory, such as the ROM 603, onto the RAM 604 and executing the program. Note that the present process is started in a case where the wireless LAN set up 1101 is selected at the screen 1100 when the MFP 300 is operating in the BLE mode.

Specifically, first, after the wireless LAN set up 1101 is selected at the screen 1100, the MFP 300 performs an AP search via the BLE mode (step S901). Then, when the AP search is complete, the MFP 300 displays an AP list. Next, the MFP 300 receives a selection of an AP from the AP list (step S902) and sets up a new wireless infrastructure mode. Specifically, the MFP 300 turns ON the wireless infrastructure mode (step S903). At this time, because the wireless infrastructure mode and the BLE mode are operating in parallel, the BLE mode is maintained without being turned off. Then, the MFP 300 connects to the AP selected from the AP list via WLAN (step S904) and infrastructure communication is made able to be executed.

Next, the processing executed to make wireless communication settings of the present embodiment when the MFP 300 is operating in the wireless infrastructure mode will be described using FIG. 10. Note that the process illustrated in FIG. 10 is actually implemented by the CPU 602 reading out a program stored in a memory, such as the ROM 603, onto the RAM 604 and executing the program. Note that the present process is started in a case where the wireless LAN set up 1101 is selected at the screen 1100 when the MFP 300 is operating in the wireless infrastructure mode.

Specifically, first, after the wireless LAN set up 1101 is selected at the screen 1100, the MFP 300 performs an AP search via the wireless infrastructure mode (step S1001). Then, when the AP search is complete, the MFP 300 displays an AP list. Next, the MFP 300 receives a selection of an AP from the AP list (step S1002) and sets up a new wireless infrastructure mode. Specifically, the MFP 300 turns OFF the wireless infrastructure mode (step S1003). This is to delete the current wireless infrastructure mode settings, such as information of the currently connected access point and the like. Furthermore, the MFP 300 turns ON a new wireless infrastructure mode corresponding to the selected AP (step S1004). Note that in a case where it is possible to switch wireless infrastructure mode settings, the ON/OFF switching of the wireless infrastructure mode here is not required. Then, the MFP 300 connects to the AP selected from the AP list via WLAN (step S1005) and infrastructure communication is made able to be executed. In this manner, a wireless infrastructure mode is newly set up by new settings content (information of a newly connected access point).

Figure 12:
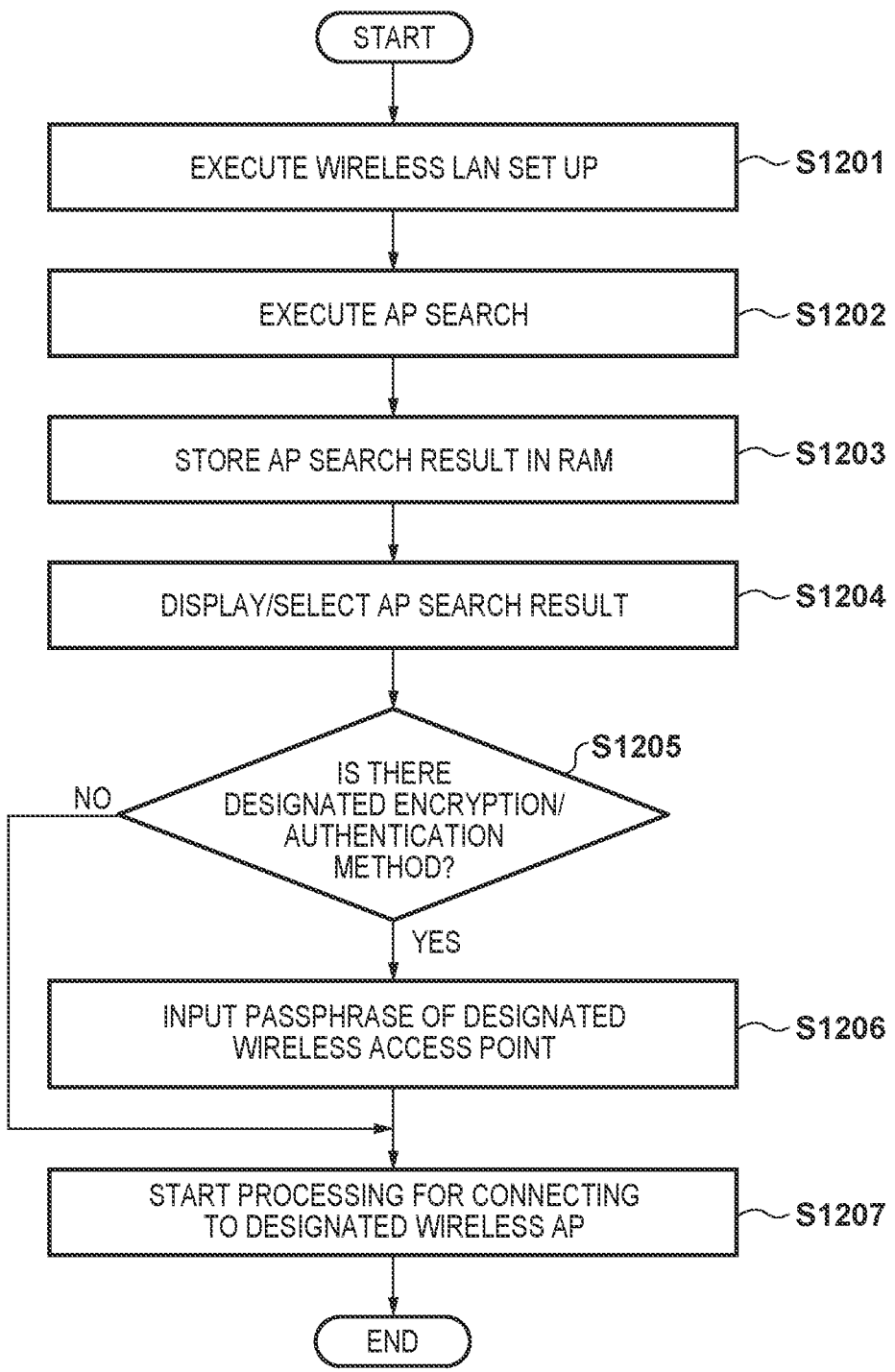
FIG. 12 is a flowchart illustrating the process when executing wireless LAN set up according to the present invention.

FIG. 12 is a flowchart illustrating detailed wireless communication settings. Note that the process illustrated by the present flowchart is actually implemented by the CPU 602 reading out a program stored in a memory, such as the ROM 603, onto the RAM 604 and executing the program.

In step S1201, when the wireless LAN set up 1101 is selected at the screen 1100 of FIG. 11A, the MFP 300 starts executing wireless LAN set up (wireless infrastructure mode set up).

In step S1202, the MFP 300 performs an AP search (wireless access point search). The details of the present process will be described using FIG. 13.

In step S1203, the MFP 300 stores the results of the AP search of step S1202 in the RAM 604. In a wireless access point search, typically, at the same time, the access point 400 periodically transmits a packet referred to as a beacon, and receiving these corresponds to the result. Examples of information given by the beacon include an SSID, frequency band, authentication method, encryption method, Mac address, radio wave intensity, and the like, as illustrated in FIG. 15. Note that FIG. 15 illustrates the results of an AP search via the BLE mode, and thus only access points using the 2.4 GHz frequency band are included. However, in a case where the result is of an AP search executed via another mode, access points using the 5 GHz frequency band may be included. While the processing of step S1202 and step S1203 is being executed, the MFP 300 displays the screen 1110 of FIG. 11B.

In step S1204, the MFP 300 displays the search results of the wireless access points stored in step S1203 as information on the operation display unit 305 as the screen 1120 of FIG. 11C. In this example, only the SSIDs are displayed, but other information may also be displayed. In an alternative configuration, detailed information of the corresponding wireless access point may be displayed in response to a user operation. Also, a wireless access point selection is received from the user.

In step S1205, the MFP 300 determines whether or not there is a designated encryption or authentication method of the access point selected in step S1204. For example, as illustrated in FIG. 15, each of the detected access points may have a designated authentication method and encryption method. The determination of the present processing is executed on the basis of this information. In a case where there is a designated encryption and authentication method (YES in step S1205), the process proceeds to step S1206. In a case where there is no designation (NO in step S1205), the process proceeds to step S1207.

In step S1206, the MFP 300 displays on the operation display unit 305 a passphrase input screen (not illustrated) in accordance with the designated encryption and authentication method. Then, when the corresponding passphrase is received from the user, the process proceeds to step S1207. Note that in a case where authentication is executed using the received passphrase and the correct passphrase has not been input, a display asking to reenter the passphrase or saying that connection failed may be displayed.

In step S1207, the MFP 300 enables the wireless infrastructure mode. Note that in a case where another communication mode other than the BLE mode is operating before the wireless infrastructure mode is enabled, the other communication mode is disabled before the wireless infrastructure mode is enabled. Then, the MFP 300 initiates a connection with the access point designated in step S1204. Note that, with the processing described above, in a case where the WFD mode or the SoftAP mode is disabled before the wireless infrastructure mode is enabled, the MFP 300 may connect to the access point before enabling the WFD mode and the SoftAP mode again. In other words, the MFP 300 may start simultaneous operation. At this time, the MFP 300 executes control such that the frequency band and the communication channel used by the wireless infrastructure mode (used to connect to the access point) may be used by the WFD mode and the SoftAP mode. Then, the present process flow ends.

AP Search Processing

Figure 13:
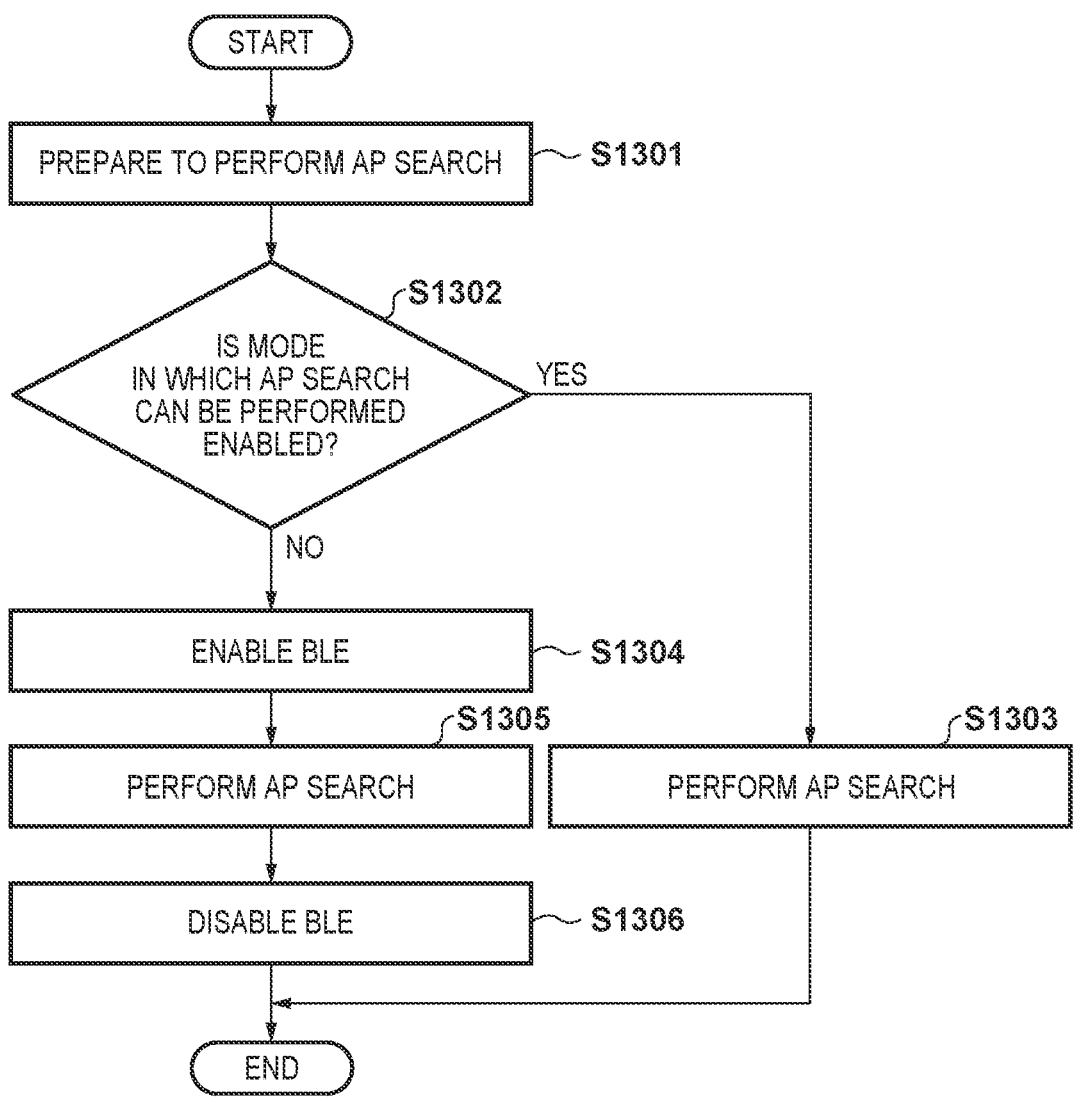
FIG. 13 is a flowchart of wireless access point search processing according to a first and third embodiment.

FIG. 13 is a flowchart of the AP search processing according to the present embodiment. The present processing corresponds to the processing of step S1202 of FIG. 12.

In step S1301, the MFP 300 executes preparations to perform an AP search. Specifically, the MFP 300 secures memory for performing an AP search.

In step S1302, the MFP 300 determines whether or not a switch in the communication mode is required to search for wireless access points. Specifically, in the present embodiment, in a case where a mode is enabled in which an AP search can be performed (at least one of: the wireless infrastructure mode, the BLE mode, the WFD mode, and the SoftAP mode), it is determined that a switch in the communication mode is not required. On the other hand, in a case where the wireless infrastructure mode or a mode in which an AP search can be performed is not enabled (all communication modes are disabled or only the wired communication mode is enabled), it is determined that a switch in the communication mode is required. In a case where a switch in the communication mode is determined to be required (NO in step S1302), the process proceeds to step S1304. In a case where a switch in the communication mode is determined to be not required (YES in step S1302), the process proceeds to step S1303.

In step S1303, the MFP 300 performs an AP search using one of the modes by which an AP search is able to be performed without switching the communication mode (without enabling or disabling a communication mode). After the AP search is complete, the present process flow ends.

In step S1304, the MFP 300 enables the BLE mode as a mode for performing an AP search. Note that at this time, in a case where another mode such as the wired communication mode is enabled, this other mode is maintained and the BLE mode is enabled. Then, the process proceeds to step S1305.

In step S1305, the MFP 300 performs an AP search. After the AP search is complete, the process proceeds to step S1306.

In step S1306, the MFP 300 disables the BLE mode enabled in step S1304. Then, the present process flow ends.

In this manner, in the present embodiment, in a case where the MFP 300 is operating in a mode other than the wireless infrastructure mode, the MFP 300 uses one of the WFD mode, the SoftAP mode, or the BLE mode as a mode for performing an AP search. This is because using the WFD mode, the SoftAP mode, and the BLE mode results in less time taken from executing processing to enable a mode until an AP search is able to be performed compared to using the wireless infrastructure mode. Specifically, the modes listed from the most amount taken to the least amount taken are: the wireless infrastructure mode, the WFD mode and the SoftAP mode, and the BLE mode.

Also, in a case where the BLE mode is enabled, the wireless infrastructure mode is not temporarily switched to. By executing switch control as described above, the amount of time taken until the AP search is complete can be reduced.

Also, in the present embodiment, even the mode before performing an AP search is the wired communication mode, the wired communication mode is not disabled before performing an AP search. This is because, in the present embodiment, the mode enabled as the mode for performing an AP search is the BLE mode, which can be enabled in parallel with the wired communication mode. Accordingly, processing to temporarily enable the pre-AP search mode after the AP search is complete is not required. This allows for less processing required after the AP search is complete.

Note that in the example described above, the BLE mode is enabled as the mode for performing an AP search. However, no such limitation is intended. In order to perform an AP search, instead of the BLE mode, the WFD mode or the SoftAP mode may be enabled, for example. These modes can also reduce the time taken until the AP search is complete, compared to the wireless infrastructure mode. Also, in an AP search using the WFD mode or the SoftAP mode, the MFP 300 can use both the 2.4 GHz and 5 GHz frequency band, whereas an AP search using the BLE mode can only use the 2.4 GHz frequency band.

As described above, in the present embodiment, using a communication apparatus provided with a wireless chip set that enables a communication mode other than the wireless infrastructure mode to be used, the P2P mode (in the example described above, the BLE mode) can be temporarily enabled for performing a wireless access point search. Accordingly, the time taken for switching communication modes in order to detect a wireless access point is reduced, and wireless access point detection is possible without impairing user-friendliness.

Second Embodiment

The second embodiment of the present invention will be described below. In this embodiment, the communication mode switched to is different depending on the frequency band used in the AP search. The MFP 300 of the present embodiment may be an apparatus capable of using only the 2.4 GHz frequency band. Note that configurations that are the same as the configurations described above are not described, and only differences are described.

In the first embodiment described above, the BLE mode is transitioned to as the mode for performing an AP search. However, BLE communication uses the 2.4 GHz frequency band. Thus, for an AP search using the BLE mode, the MFP 300 can only use the 2.4 GHz frequency band. In the present embodiment that will now be described, an AP search using the 5 GHz frequency band can be performed.

Processing Sequence

Figure 14:
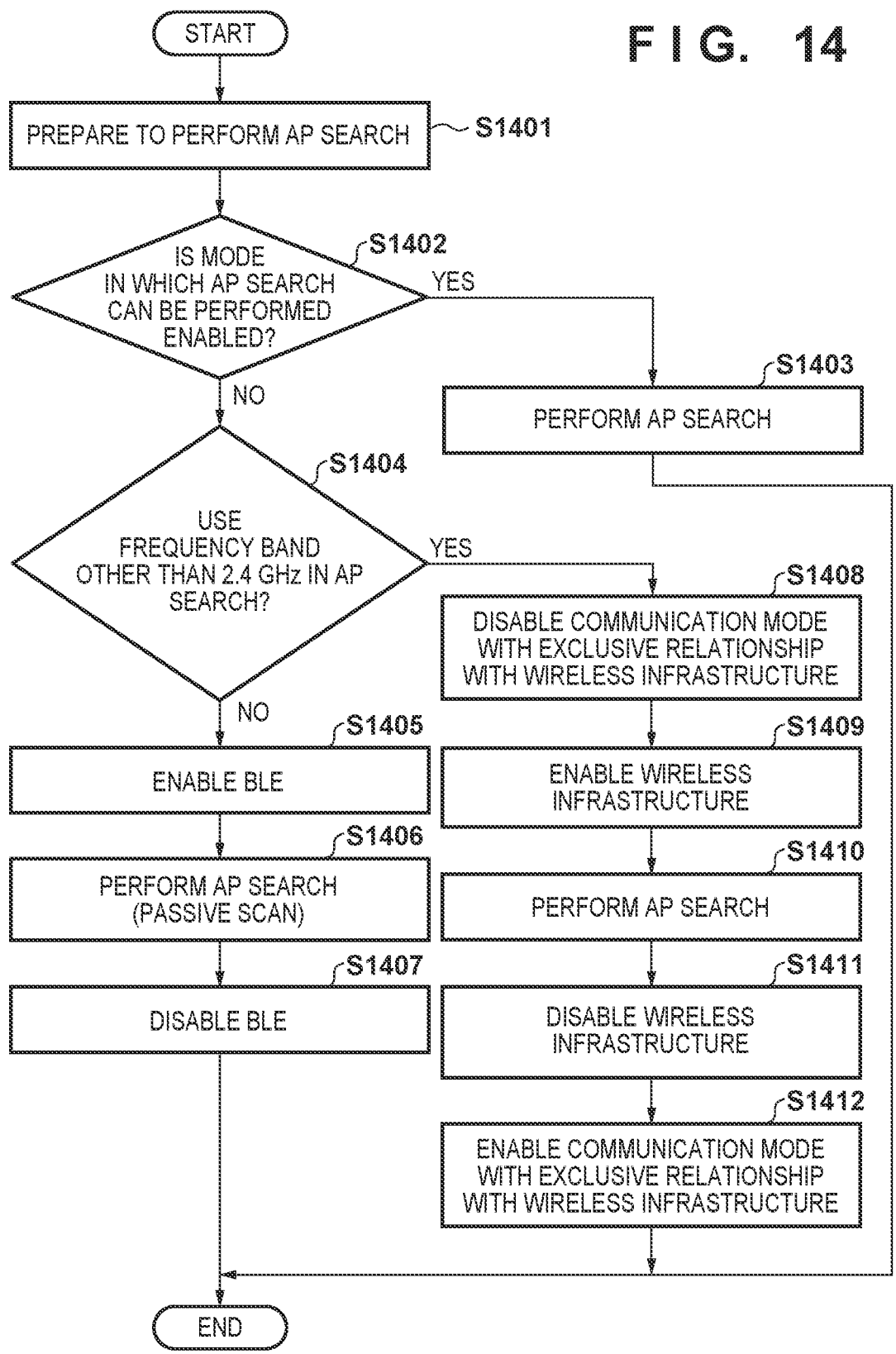
FIG. 14 is a flowchart of wireless access point search processing according to a second embodiment.

The process of an AP search according to the present embodiment will now be described using FIG. 14. The process illustrated by the present flowchart is actually implemented by the CPU 602 reading out a program stored in a memory, such as the ROM 603, onto the RAM 604 and executing the program. Note that the processing and configurations other than that relating to the AP search processing is similar to that of the first embodiment.

In step S1401, the MFP 300 executes preparations to perform an AP search. This processing is similar to the processing of step S1301.

In step S1402, the MFP 300 determines whether or not a switch in the communication mode is required to search for wireless access points. This processing is similar to the processing of step S1302. In a case where a switch in the communication mode is determined to be required (NO in step S1402), the process proceeds to step S1404. In a case where a switch in the communication mode is determined to be not required (YES in step S1402), the process proceeds to step S1403.

In step S1403, the MFP 300 performs an AP search without switching the communication mode. After the AP search is complete, the present process flow ends.

In step S1404, the MFP 300 determines whether or not to use a frequency band other than 2.4 GHz (in this example, 5 GHz) in the AP search. Specifically, in a case where the MFP 300 is an apparatus capable of only using 2.4 GHz, NO is determined, and in a case where the MFP 300 is an apparatus capable of using both 2.4 GHz and 5 GHz, YES is determined. Also, for example, in a case where an AP search is performed after receiving an instruction from an external apparatus such as the portable terminal 200, the MFP 300 determines whether or not an instruction to perform an AP using the 5 GHz frequency band is included in the instruction. Then, in a case where an instruction to perform an AP search using the 5 GHz frequency band is included in the instruction, the MFP 300 determines YES, and in a case where an instruction to perform an AP search using the 5 GHz frequency band is not included in the instruction, the MFP 300 determines NO. In a case where a frequency band other than 2.4 GHz is not used in the AP search (NO in step S1404), the process proceeds to step S1405, and in a case where a frequency band other than 2.4 GHz is used in the AP search (YES in step S1404), the process proceeds to step S1408.

In step S1405, the MFP 300 enables the BLE mode as a mode for performing an AP search. This processing is similar to the processing of step S1304. Then, the process proceeds to step S1406.

In step S1406, the MFP 300 performs an AP search. At this time, the MFP 300 performs an AP search with the BLE mode enabled. Thus, the AP search is performed using the 2.4 GHz frequency band, which is the frequency band used by BLE communication. After the AP search is complete, the process proceeds to step S1407.

In step S1407, the MFP 300 disables the BLE mode enabled in step S1405. Then, the present process flow ends.

In step S1408, in a case where the MFP 300 is operating in a communication mode with an exclusive relationship with the wireless infrastructure mode (unable to operate in parallel with the wireless infrastructure mode), this mode is disabled. Note that in a case where such a mode is not in operation, this processing is omitted. An example of a communication mode with an exclusive relationship with the wireless infrastructure mode is the wired communication mode, for example. Then, the process proceeds to step S1409.

In step S1409, the MFP 300 enables the wireless infrastructure mode. Then, the process proceeds to step S1410.

In step S1410, the MFP 300 performs an AP search. At this time, the MFP 300 performs an AP search with the wireless infrastructure mode enabled. Thus, the AP search is performed using the 5 GHz frequency band, which is the frequency band used by infrastructure communication. Note that at this time, an AP search may be performed using the 2.4 GHz frequency band instead of the 5 GHz frequency band. After the AP search is complete, the process proceeds to step S1411.

In step S1411, the MFP 300 disables the wireless infrastructure mode enabled in step S1409. Then, the process proceeds to step S1412.

In step S1412, the MFP 300 enables the communication mode with an exclusive relationship with the wireless infrastructure mode disabled in step S1408. In a case where no communication modes are disabled in step S1408, the present processing is omitted. Then, the present process flow ends.

With the configuration described above, the time required for the processing to temporarily switch to the BLE mode from step S1405 to step S1407 is reduced compared to the time required for the processing to temporarily switch to the wireless infrastructure mode from step S1408 to step S1410. Thus, in a case where an AP search is performed using the 2.4 GHz frequency band, by executing control to switch to the BLE mode as described above, the time taken can be reduced.

Also, in a case where an AP search is performed using the 5 GHz frequency band, by transitioning to the wireless infrastructure mode, an AP search can be performed using the 5 GHz frequency band.

In the example described above, the wireless infrastructure mode is enabled as the mode for performing an AP search using the 5 GHz frequency band. However, no such limitation is intended. In order to perform an AP search using the 5 GHz frequency band, instead of the wireless infrastructure mode, the WFD mode or the SoftAP mode may be enabled, for example.

Other Embodiments

In the embodiments described above, a wireless LAN or Bluetooth (registered trademark) standard is used as an example of the used communication interface. However, in the present invention, other wireless communication standards may be used. For example, the present invention is applicable to cases including additions or changes to the wireless LAN communication standard and newly useable wireless communication standards. Also, in the examples described above, the 2.4 GHz band and the 5 GHz band are used as the used frequency band. However, the present invention is applicable to cases including additions or changes to the wireless communication standards as described above and newly useable frequency bands other than the frequency bands described above.

In the embodiments described above, in a case where the wireless LAN set up 1101 is selected at the screen 1100, an AP search is performed. However, the timing of when the AP is performed is not limited thereto. For example, the MFP 300 may have a function (set up function) of, when connecting to the portable terminal 200, receiving information of the access point used in the wireless infrastructure mode. The AP search may be performed when an instruction to execute the set up function is received. Note that a method of communicating with the portable terminal 200 for the set up function may use the BLE mode or may use the SoftAP mode. Thus, in a case where an instruction to execute the set up function is received, the MFP 300 enables one or both of the BLE mode and the SoftAP mode. In the present embodiment, both of these communication modes are communication modes in which an AP search is able to be performed. Thus, an AP search is performed via one of the BLE mode or the SoftAP mode by the MFP 300 after an instruction to execute the set up function is received and one or both of the BLE mode and the SoftAP mode are enabled. In other words, the MFP 300 does not need to enable the wireless infrastructure mode for the AP search of the set up function. The AP list generated by an AP search performed as such is transmitted to the portable terminal 200. Then, the information relating to the access point selected on the portable terminal 200 is received by the MFP 300, and operates in the wireless infrastructure mode are started using the access point.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus capable of operating in at least one of a plurality of modes including a first communication mode in which wired communication is performed with another apparatus and a second communication mode in which wireless communication is performed with another apparatus not via an external access point, the communication apparatus comprising:
    at least one processor configured to function as:
        a controlling unit configured to control a communication mode of the communication apparatus by enabling or disabling at least one of the plurality of communication modes;
        a receiving unit configured to receive an instruction for search processing to search for the external access point near the communication apparatus; and
        an executing unit configured to, based on reception of the instruction, execute search processing to search for the external access point near the communication apparatus,
        wherein in a case where the instruction has been received in a state where the first communication mode is enabled, the second communication mode is enabled and the search processing is executed in the second communication mode.

2. The communication apparatus according to claim 1, wherein in a case where the instruction has been received in a state where the first communication mode is enabled, the search processing is executed in the second communication mode while maintaining the first communication mode.

3. The communication apparatus according to claim 1, wherein the first communication mode is a mode for executing communication via a wired LAN.

4. The communication apparatus according to claim 1, wherein the second communication mode is a mode for executing communication according to Bluetooth Low Energy (BLE).

5. The communication apparatus according to claim 1, wherein the second communication mode is a mode for executing communication compliant with the Institute of Electrical and Electronics Engineers (IEEE) 802.11 series.

6. The communication apparatus according to claim 5, wherein the second communication mode is a mode for executing communication based on Wi-Fi Direct or a mode where the communication apparatus operates as an access point.

7. The communication apparatus according to claim 5, wherein the plurality of communication modes include a third communication mode in which wireless communication is performed with another apparatus via the external access point, and
    wherein the first communication mode and the third communication mode cannot be enabled in parallel.

8. The communication apparatus according to claim 1, wherein the at least one processor is further configured to function as a connecting unit configured to connect the communication apparatus to an external access point from among external access points retrieved by the search processing.

9. The communication apparatus according to claim 8, further comprising a display configured to display a list of external access points retrieved by the search processing,
    wherein an external access point selected from the list by a user and the communication apparatus are connected.

10. The communication apparatus according to claim 9, wherein the plurality of communication modes include a third communication mode in which wireless communication is performed with another apparatus via the external access point,
    the third communication mode is enabled after the search processing is executed, and
        communication is performed in the first communication mode via the external access point selected from the list by the user.

11. The communication apparatus according to claim 10, wherein the third communication mode is enabled after the search processing is executed and the second communication mode is disabled.

12. The communication apparatus according to claim 1, further comprising a printer to perform printing.

13. The communication apparatus according to claim 1, wherein in a case where the instruction is received in a state where the second communication mode is enabled, the search processing is executed via the second communication mode without enabling or disabling any communication modes of the plurality of communication modes.

14. The communication apparatus according to claim 1, wherein the plurality of communication modes include a third communication mode in which wireless communication is performed with another apparatus via the external access point, and
    wherein the instruction has been received in a state where the third communication mode is enabled, the search processing is executed via the third communication mode without enabling or disabling any communication modes of the plurality of communication modes.

15. The communication apparatus according to claim 1, wherein the plurality of communication modes include a third communication mode in which wireless communication is performed with another apparatus via the external access point, and
    in a case where both the first communication mode and the third communication mode are disabled and the search processing is executed at a first frequency band and not executed at a second frequency band different from the first frequency band, the second communication mode is enabled and the search processing is executed in the second communication mode, and
    in a case where both the second communication mode and the third communication mode are disabled and the search processing is executed at the second frequency band different from the first frequency band, a communication mode other than the second communication mode is enabled and the search processing is executed in the communication mode other than the second communication mode.

16. The communication apparatus according to claim 15, wherein the communication mode other than the second communication mode is a communication mode, different from the second communication mode, in which wireless communication is performed with another apparatus bypassing the external access point, or the third communication mode.

17. The communication apparatus according to claim 15, wherein
the first frequency band is a 2.4 GHz frequency band, and
the second frequency band is a 5 GHz frequency band.

18. A non-transitory computer-readable storage medium storing a program for causing a computer, capable of operating in at least one of a plurality of modes including a first communication mode in which wired communication is performed with another apparatus and a second communication mode in which wireless communication is performed with another apparatus not via an external access point, to:
control a communication mode of the communication apparatus by enabling or disabling at least one of the plurality of communication modes;
receive an instruction for search processing to search for the external access point near the communication apparatus; and
based on the reception of the instruction, execute search processing to search for the external access point near the communication apparatus,
wherein in a case where the instruction has been received in a state where the first communication mode is enabled, the second communication mode is enabled and the search processing is executed in the second communication mode.

19. A method of controlling a communication apparatus capable of operating in at least one of a plurality of modes including a first communication mode in which wired communication is performed with another apparatus and a second communication mode in which wireless communication is performed with another apparatus not via an external access point, the communication apparatus comprising:
a controlling unit configured to control a communication mode of the communication apparatus by enabling or disabling at least one of the plurality of communication modes;
a receiving unit configured to receive an instruction for search processing to search for the external access point near the communication apparatus; and
an executing unit configured to, based on the reception of the instruction, execute search processing to search for the external access point near the communication apparatus,
wherein in a case where the instruction has been received in a state where the first communication mode is enabled, the second communication mode is enabled and the search processing is executed in the second communication mode.

* * * * *